US012559419B2

(12) United States Patent
Claireaux

(10) Patent No.: US 12,559,419 B2
(45) Date of Patent: Feb. 24, 2026

(54) MINERAL WOOL

(71) Applicant: SAINT-GOBAIN ISOVER, Courbevoie (FR)

(72) Inventor: Corinne Claireaux, Paris (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 722 days.

(21) Appl. No.: 17/276,840

(22) PCT Filed: Sep. 23, 2019

(86) PCT No.: PCT/FR2019/052222
§ 371 (c)(1),
(2) Date: Mar. 17, 2021

(87) PCT Pub. No.: WO2020/065191
PCT Pub. Date: Apr. 2, 2020

(65) Prior Publication Data
US 2021/0347683 A1      Nov. 11, 2021

(30) Foreign Application Priority Data
Sep. 26, 2018    (FR) ........................................ 1858814

(51) Int. Cl.
*C03C 13/06*        (2006.01)
*C03C 3/087*        (2006.01)

(52) U.S. Cl.
CPC .............. *C03C 13/06* (2013.01); *C03C 3/087* (2013.01); *C03C 2213/00* (2013.01)

(58) Field of Classification Search
CPC ...................................................... C03C 13/06
See application file for complete search history.

(56) References Cited

U.S. PATENT DOCUMENTS 6,284,684 B1 * 9/2001 Vignesoult .............. C03C 13/00
                                                    501/36
2008/0191179 A1 * 8/2008 Bernard .................. C03C 25/34
                                                    501/36

FOREIGN PATENT DOCUMENTS

| | | |
|---|---|---|
| EP | 0583791 | 2/1994 |
| FR | 2918053 A1 | 1/2009 |
| WO | WO-2005033032 A1 | 4/2005 |
| WO | WO-2006103375 A2 | 10/2006 |

OTHER PUBLICATIONS

International Search Report issued Dec. 18, 2019 in PCT/FR2019/052222 (with English translation), 7 pages.

* cited by examiner

*Primary Examiner* — Cameron K Miller
(74) *Attorney, Agent, or Firm* — Element IP, PLC

(57)             ABSTRACT

A mineral wool having a chemical composition comprising the following constituents, as percentages by weight:

| | |
|---|---|
| $SiO_2$ | 39-50% |
| $Al_2O_3$ | 19.5-27% |
| CaO | 5-12% |
| MgO | 1-5% |
| $Na_2O$ | 5-20% |
| $K_2O$ | 0-15% |
| $Fe_2O_3$ | 2-15% |
| $B_2O_3$ | 0-2% | a MgO/RO weight ratio of more than 0.10 and less than 0.50, and
a RO/(RO+$R_2$O) weight ratio of less than 0.55,
in which RO represents the alkaline earth oxides CaO, MgO, BaO and SrO, and
$R_2$O represents the alkali oxides $Na_2O$ and $K_2O$.

19 Claims, 1 Drawing Sheet

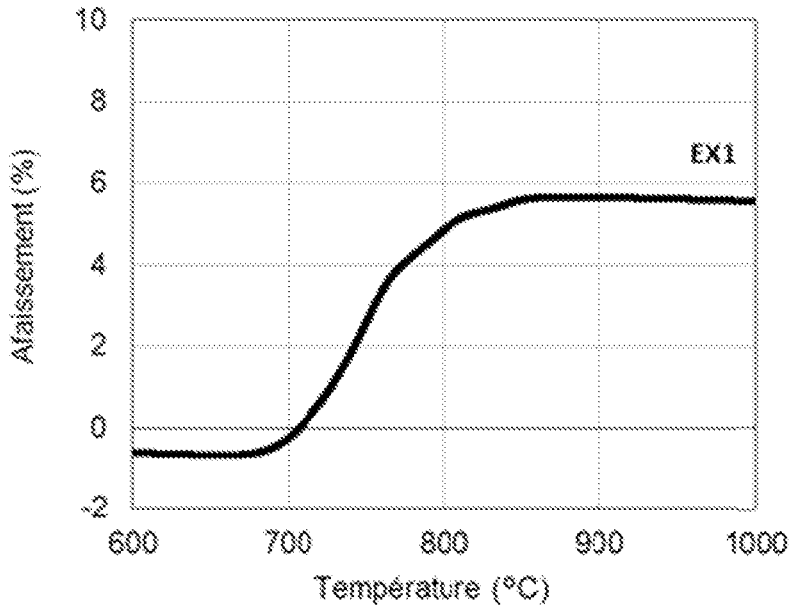

MINERAL WOOL

TECHNICAL FIELD

The present invention relates to the field of artificial mineral wools. More particularly, it relates to mineral wools intended for the production of thermal insulation materials. In particular, it concerns mineral wools for fire protection applications.

More particularly, it concerns mineral wools the chemical compositions of which give rise to a high liquidus temperature and high fluidity at their fiberizing temperature, associated with a high glass transition temperature.

PRIOR ART

Conventionally, this type of mineral wool is fiberized by spinning processes known as "external" processes, for example of the type employing a cascade of spinner wheels supplied with molten material via a static distribution device as described, in particular, in patents EP 0 465 310 or EP 0 439 385.

In contrast, the process for fiberizing by spinning known as the "internal" process, i.e. employing spinners that rotate at high speeds and which are perforated by orifices, is conventionally reserved for fiberizing mineral wool of the glass wool type, broadly having a composition that is relatively rich in alkaline oxides and with a low alumina content, a liquidus temperature that is not very high and for which the viscosity at the liquidus temperature is higher than that of rock wool or basalt. That process has been described in patents EP 0 189 354 or EP 0 519 797 in particular.

Technical solutions that can be used to adapt the internal spinning process to fiberizing rock wool are known from WO 93/02977 in particular, by modifying the composition of the constituent material of the spinners and their operational parameters. That adaptation then means that properties that until then were inherent to one or the other of the two types of wool, rock or glass, can be combined. Thus, the quality of the rock wool obtained by internal spinning is comparable to glass wool, with a lower shot content than rock wool that is obtained conventionally. However, it retains the two key advantages linked to its chemical nature, namely low cost of the starting materials and high temperature stability.

A health criterion has recently been added to the criteria for quality and industrial and economic feasibility. Mineral wools on the market have to be biosoluble, namely have the capacity to dissolve rapidly in a physiological medium, with a view to preventing any potential pathogenic risk linked to possible accumulation of very fine fibers in the organism by inhalation.

Finally, for certain applications, the availability of mineral wools with good stability at very high temperatures is desirable. The fire resistance of a construction element corresponds to the period of time during which the element retains its load-bearing function, guarantees flame protection and retains its thermal insulator role. The standard fire test generally consists of raising the temperature in accordance with the standard ISO 834, which is based on the temperature profile for a cellulose fire.

Mineral wool compositions that comply with fiberizing capability criteria using internal spinning processes, biosolubility and good high temperature stability have been developed. Compositions of this type are described, for example, in WO 2005/033032. However, in order to comply with the very high temperature stability requirements, those mineral fibers have to be coated with a phosphate-containing organic additive such as that described in WO 2006/103375.

SUMMARY OF THE INVENTION

The aim of the present invention is to propose mineral wool compositions that are both capable of being fiberized using internal spinning processes, capable of being biosoluble, and stable at very high temperatures without having to resort to organic phosphate-containing additives.

In these processes, fiberizing progresses in an optimal manner when the molten material has a viscosity of 3 poise. The fiberizing temperature at which this viscosity must be reached ($T_{fib} \approx T_{log3}$) must be less than 1220° C. On the other hand, because the temperature is not ideally constant over time, nor completely homogeneous during fiberizing, a sufficient difference is necessary between the fiberizing temperature ($T_{fib}$) and the liquidus temperature ($T_{liq}$). This difference, known as the fiberizing range, must be at least 40° C. in order to avoid any problems with devitrification and obstruction of the plates during fiberizing. For this reason, the liquidus temperature ($T_{liq}$) must be less than 1180° C.

The subject matter of the invention provides a mineral wool having a chemical composition comprising the following constituents, as percentages by weight:

| | |
|---|---|
| SiO$_2$ | 39-50%, preferably 39-49% |
| Al$_2$O$_3$ | 19.5-27%, preferably 20-26% |
| CaO | 5-12%, preferably 6-11% |
| MgO | 1-5%, preferably 2-5% |
| Na$_2$O | 5-20%, preferably 6-18% |
| K$_2$O | 0-15%, preferably 1-12% |
| Fe$_2$O$_3$ | 2-15%, preferably 3-12% |
| B$_2$O$_3$ | 0-2%, preferably 0-1.5% | a MgO/RO weight ratio of more than 0.10 and less than 0.50,
preferably less than 0.40, or even less than 0.30, and
a RO/(RO+R$_2$O) weight ratio of less than 0.55,
in which RO represents the alkaline earth oxides CaO, MgO, BaO and SrO, and R$_2$O represents the alkali oxides Na$_2$O and K$_2$O.

Compositions of this type have significantly improved very high temperature stability properties, while retaining the desired biosolubility and processability properties ($T_{fib} \approx T_{log3}$ less than 1220° C., $T_{liq}$ less than 1180° C. and $T_{fib}-T_{liq}$ more than 40° C.). In particular, these combined properties have been able to be obtained because of the choice of both a relatively low lime content (less than 12%), the presence of magnesia and a distinctive equilibrium between the alkaline earth oxides and the alkali oxides (0.10<MgO/RO<0.50 and RO/(RO+R$_2$O)<0.55).

The invention also concerns a thermal and/or acoustic insulation product comprising a mineral wool as described above.

The invention also concerns the use of the mineral wool described above in fire-resistant construction systems.

BRIEF DESCRIPTION OF THE DRAWINGS

FIG. 1 shows the thermomechanical strength profile for Example 1 in accordance with the invention.

DETAILED DESCRIPTION

In the compositions in accordance with the invention, the sum of the SiO$_2$, Al$_2$O$_3$, CaO, MgO, R$_2$O, Fe$_2$O$_3$ and B$_2$O$_3$ contents preferably represents at least 95%, in particular at least 97%, or even at least 98% of the weight of the mineral wool composition.

The silica content ($SiO_2$) is in a range from 39% to 50%, in particular 49%, or even 48%. A content of more than 50% could reduce the biosolubility of the mineral fibers. A content of less than 39% could have an adverse effect on the viscosity of the composition at the fiberizing temperatures.

The alumina content ($Al_2O_3$) is in a range from 19.5% to 27%, in particular 20%, or even 21% to 26.5%, or even 26%. A content of more than 27% could increase the liquidus temperature. A content of less than 19.5% could have an adverse effect on the viscosity of the composition at the fiberizing temperatures, as well as on the very high temperature stability.

The lime content (CaO) is in a range from 5% to 12%, in particular 6%, or even 7%, or 8% to 11%, or even 10%. Contents of less than 5% could increase the liquidus temperature.

The magnesia content (MgO) is in a range from 1% (or 1.0%) to 5%, in particular 2%, or even 3%, to 4%. MgO contributes to the very high temperature stability.

In general, the mineral wool contains no other alkaline earth oxides apart from CaO and MgO. However, it may contain small quantities of BaO or SrO, in contents which may be as high as 2%, or even 1%, 0.20%, or in fact 0.1%, these oxides possibly being present as impurities in certain starting materials.

The ratio between the magnesium oxide and the sum of the alkaline earth oxides (CaO, MgO, BaO and SrO):MgO/RO, is more than 0.10 and less than 0.50, in particular 0.11, or even 0.12 to 0.40, or even 0.38, 0.35 or in fact 0.30. A MgO/RO ratio of less than 0.10 could affect the very high temperature stability. In contrast, a MgO/RO ratio of more than 0.50 could increase the liquidus.

The total alkali oxide content ($R_2O$), in particular soda ($Na_2O$) and potash ($K_2O$), is preferably more than 12%. The $Na_2O$ content is in a range from 5% to 20%, in particular 6%, or even 7%, or 8% to 18%, or even 15%, or 12%. In turn, the $K_2O$ content is at most 15%, in particular 1%, or even 2%, or 3% to 12%, or even 10%, 8%, or 5%. The mineral wool preferably contains no other alkali oxide apart from $Na_2O$ and $K_2O$. However, it may contain small quantities of $Li_2O$, which is sometimes present by way of impurities in certain starting materials, in amounts which may be up to 0.5%, or even 0.2%, or in fact 0.1%.

The ratio RO/(RO+$R_2O$) is less than 0.55, in particular 0.15, or even 0.20 or 0.30 to 0.53, or even 0.50. A RO/(RO+$R_2O$) ratio of more than 0.55 could affect the fiberizing capability of the composition.

The iron oxide content ($F_2O_3$) is in a range from 2% to 15%, in particular 3%, or even 5%, or 6% to 12%, or even 10%, or 8%.

The boron oxide content ($B_2O_3$) is at most 2%, in particular 0.1%, or even 0.5%, 1.5%, or even 1%. The presence of boron may be advantageous in improving the biosolubility of the fibers and/or in improving their insulating properties.

The composition of the mineral fibers in accordance with the invention may also contain $P_2O_5$, in particular in amounts of up to 3%, or even up to 1.2%, in order to increase the biosolubility at a neutral pH. However, it is preferably free from $P_2O_5$.

The composition in accordance with the invention may also comprise other elements that are present by way of inevitable impurities. It may comprise titanium oxide ($TiO_2$)

and zirconium oxide ($ZrO_2$) in contents in a range up to 3%, in particular from 0.1% to 2.0%, or even 1.0%.

Clearly, the various preferred ranges described above may be freely combined with each other; for the purposes of conciseness, the various combinations cannot be itemized.

In accordance with a preferred embodiment, the mineral fibers in accordance with the invention have a chemical composition comprising the following constituents, as percentages by weight:

| | |
|---|---|
| $SiO_2$ | 39% to 48% |
| $Al_2O_3$ | 20% to 26% |
| CaO | 6% to 10% |
| MgO | 2% to 4% |
| $Na_2O$ | 7% to 15% |
| $K_2O$ | 2% to 8% |
| $Fe_2O_3$ | 3% to 8% |
| $B_2O_3$ | 0 to 1.5% | a MgO/RO weight ratio of more than 0.10 and less than 0.50,
preferably less than 0.40, or even less than 0.30 and
a RO/(RO+$R_2O$) weight ratio of less than 0.55.

The invention also pertains to a process for obtaining mineral fibers in accordance with the invention, comprising a step for fusion of a vitrifiable mixture having substantially the same chemical composition as that of said mineral fibers; then a step for fiberizing, in particular by internal spinning.

The fusion step can be used to obtain a bath of molten material starting from a vitrifiable mixture. The vitrifiable mixture comprises a variety of natural and/or artificial starting materials, for example silica sand, phonolite, dolomite, sodium carbonate, etc.

The fusion step may be carried out in different known manners, in particular by fusion in a fired furnace, or by electric fusion.

The fired furnace comprises at least one burner, which may be overhead (the flames are disposed above the bath of molten material and heat it by radiation), or submerged (the flames are generated directly within the bath of molten material). The or each burner may be supplied with a variety of fuels such as natural gas or fuel oil.

The term "electric fusion" means that the vitrifiable mixture is molten by the Joule effect using electrodes immersed in the bath of molten material, and excludes the use of any other heating means such as fire. The vitrifiable mixture is normally homogeneously distributed over the surface of the bath of molten material with the aid of a mechanical device, and therefore constitutes a thermal screen limiting the temperature above the bath of molten material, so the presence of a superstructure is not always necessary. The electrodes may be suspended in a manner such as to be immersed in the bath of molten material from above, they may be installed in the hearth, or in fact be installed in the side walls of the furnace vessel. The first two options are generally preferred for large furnace vessels in order to distribute the heating of the bath of molten material better. The electrodes are preferably produced from molybdenum, or optionally from tin oxide. The molybdenum electrode is preferably passed through the hearth by means of a water-cooled steel electrode holder.

The fusion step may also involve both flame fusion and electric fusion, for example by using a fired furnace which is also equipped with electrodes on the side walls, acting to speed up fusion of the vitrifiable mixture.

The fiberizing step is preferably carried out by internal spinning.

The fibers obtained may be bonded together with the aid of a binding compound which is sprayed onto their surface before being received and shaped in order to produce various mineral wool products, such as rolls or panels. The mineral wool products which are bonded in this manner preferably comprise at most 15% dry weight of binder with respect to the total weight of the binder and the mineral fibers.

In order to obtain even better fire resistance, the mineral wool may comprise a phosphorus-containing additive, preferably sprayed on at the same time as the binding compound. The phosphorus-containing additive may be a mineral additive such as that described in application WO 01/68546, or a phosphate-containing organic additive, for example an oligomer or polymer of the phosphonic or phosphoric polyacid or polyester type, as disclosed in the application WO 2006/103375. However, the mineral wool compositions in accordance with the invention have the advantage of intrinsically possessing very good very high temperature stability properties, so that it is not necessary to resort to such phosphorus-containing compounds, even for highly demanding applications such as fire protection applications. Advantageously, the mineral wool does not include a phosphorus-containing additive.

The invention also concerns a thermal insulation product comprising mineral fibers in accordance with the invention. A product of this type is in particular in the form of rolls or panels. It may be used, for example, in buildings, in industry or in transport means, especially railroad or marine transport. It is particularly suitable for applications in which it could be subjected to high temperatures, either continuously (furnace insulation or insulation for domestic or industrial ovens, or insulation for fluid transport lines), or accidentally, in a fire protection role (fire doors, boat insulation, insulation of tunnels or of offshore platforms, etc.). More generally, the product in accordance with the invention may be used to thermally insulate any type of tertiary building or dwelling (collective or individual). It may, for example, be used in external insulation systems, for the insulation of timber framed buildings, in sandwich panels, in ventilation ducts, etc.

The invention also relates to the use of the mineral wool described above in fire resistant construction systems.

The term "fire-resistant construction systems" is used for systems, generally comprising assemblies of materials, in particular based on mineral wool and metal plates capable of delaying the propagation of heat effectively, as well as providing protection against flames and hot gases and maintaining mechanical strength during a fire.

Standardized tests define the degree of fire resistance, expressed in particular as the time required for a given temperature to be reached on the opposite side of the construction system subjected to a flow of heat released, for example, by the flame of a burner or electric oven.

In particular, a construction system is considered to have satisfactory fire resistance capability if it is capable of meeting the requirements of one of the following tests:

fire door test: tests on mineral fiber boards as defined in the German standard DIN 18 089—Teil [part] 1 (or equivalent).

Fire behavior of material and elements for construction, as defined in the German standard DIN 4102 (or equivalent). In particular, the standard DIN 4102—Teil 5 is considered for full scale tests to determine the fire resistance class, and/or DIN 4102—Teil 8 is considered for tests on samples using a small test bench.

Test according to IMO Standard Test A 754 (18) (or equivalent), which describes the general requirements for fire resistance tests for "marine" type applications, including boat bulkheads. These tests are carried out on large-sized samples, with 3 m by 3 m furnaces an example that may be cited is the case of a steel bridge where the performance required in the case of a fire on the insulation side is to meet the thermal insulation criterion for at least 60 minutes.

The examples below illustrate the invention in a non-limiting manner.

EXAMPLES

Examples of glasses (Example 1 in accordance with the invention and comparative examples C1 to C4), the compositions by weight of which are shown in Table 1, were produced.

The fiberizing range corresponds to the difference between the fiberizing temperature at which the composition must have a viscosity of approximately 3 poise, and the liquidus temperature ($T_{fib}-T_{liq} \approx T_{log3}-T_{liq}$).

The slump was determined by thermomechanical analysis. The glasses obtained were reduced to powder with a granulometry of less than 40 μm. Each type of powdered glass was compressed into the form of cylindrical pellets 5 mm in diameter and with a height of approximately 1 cm and a density equal to 64% of that of the glass. The slump, expressed as a percentage, corresponds to the variation in the height of a powdered glass pellet subjected to a ramp-up of 10K/min from ambient temperature to 1000° C. compared with the initial height of the pellet. The measurement of the height of the sample was carried out with the aid of a sensor placed at the top of the cylinder. Reproducibility tests enabled a standard deviation of less than 1% to be defined. A slump of less than 10% is considered to be necessary in order to obtain a resistance to the cellulose fire profile described in the standard ISO 834.

| Glass | 1 | C1 | C2 | C3 | C4 |
|---|---|---|---|---|---|
| $SiO_2$ | 42.3 | 50.0 | 42.4 | 41.6 | 41.2 |
| $Al_2O_3$ | 24.2 | 20.6 | 24.0 | 26.5 | 16.1 |
| CaO | 9.0 | 10.3 | 11.8 | 12.6 | 24.5 |
| MgO | 3.3 | 4.5 | 1.0 | 2.9 | 6.1 |
| $Na_2O$ | 9.5 | 7.1 | 10.3 | 6.6 | 1.9 |
| $K_2O$ | 3.9 | 0.9 | 3.5 | 4.0 | 1.5 |
| $Fe_2O_3$ | 6.9 | 6.5 | 6.5 | 4.8 | 6.3 |
| $B_2O_3$ | 0 | 0 | 0 | 0 | 0 |
| BaO | <0.1 | 0 | <0.1 | 0.37 | 0.22 |
| $P_2O_5$ | 0 | 0.02 | 0 | 0 | 0.4 |
| TiO2 | 0.56 | 0 | <0.1 | 0.25 | 0.9 |
| Other | <0.3 | <0.1 | <0.4 | <0.4 | <0.9 |
| MgO/RO | 0.27 | 0.30 | 0.08 | 0.18 | 0.20 |
| RO/(RO + $R_2O$) | 0.48 | 0.65 | 0.48 | 0.60 | 0.90 |
| $T_{log3}$ (° C.) | 1187 | 1234 | | | 1140 |
| $T_{liq}$ (° C.) | 1140 | 1200 | | | >1220 |
| Fiberizing range (° C.) | >40 | 34 | | | >40 |
| Slump (%) | 5.5 | >10 | >10 | >10 | 6.9 |

FIG. 1 shows that the composition of Example 1 in accordance with the invention has a low slump which is maintained up to 1000° C., indicating good high temperature stability. This composition also exhibits a temperature $T_{log3}$ of less than 1220° C., a temperature $T_{liq}$ of less than 1180° C. and a fiberizing range of more than 40° C., which means that internal spinning can be carried out with no risk of devitrification. In contrast, the compositions of the comparative examples C1 to C4 could not satisfy the whole set of criteria. The compositions C1, C2 and C3 did not have a sufficient very high temperature stability, while composition C4 had a $T_{liq}$ which was too high to be able to be fiberized by internal spinning.

The invention claimed is:

1. A mineral wool having a chemical composition comprising the following constituents, as percentages by weight:

| | |
|---|---|
| SiO₂ | 39-50%; |
| Al₂O₃ | 19.5-27%; |
| CaO | 5-12%; |
| MgO | 1-5%; |
| Na₂O | 5-20%; |
| K₂O | 0-15%; |
| Fe₂O₃ | 2-15%; and |
| B₂O₃ | 0-2%%; | wherein the composition has a MgO/RO weight ratio of 0.12 to 0.30 and a RO/(RO+R₂O) weight ratio of less than 0.55 0.50, wherein RO represents the alkaline earth oxides CaO, MgO, BaO, and SrO, and R₂O represents the alkali oxides Na₂O and K₂O.

2. The mineral wool as claimed in claim 1, wherein the R₂O content is more than 12%.

3. The mineral wool as claimed in claim 1, wherein the composition comprises 0 to 0.20% of BaO.

4. The mineral wool as claimed in claim 1, wherein the SiO₂ content is from 39% to 48%.

5. The mineral wool as claimed in claim 1, wherein the Al₂O₃ content is from 21% to 26%.

6. The mineral wool as claimed in claim 1, wherein the CaO content is from 8% to 10%.

7. The mineral wool as claimed in claim 1, wherein the MgO content is from 3% to 4%.

8. The mineral wool as claimed in claim 1, wherein the content of Na₂O is from 8% to 10%.

9. The mineral wool as claimed in claim 1, wherein the K₂O content is from 3% to 5%.

10. The mineral wool as claimed in claim 1, wherein the Fe₂O₃ content is from 6% to 8%.

11. A thermal and/or acoustic insulation product, comprising the mineral wool as claimed in claim 1.

12. The mineral wool as claimed in claim 1, wherein the composition has a RO/(RO+R₂O) weight ratio from 0.15 to 0.48.

13. The mineral wool as claimed in claim 1, wherein the composition has a RO/(RO+R₂O) weight ratio from 0.20 to 0.48.

14. A fire resistant construction system comprising the mineral wool as claimed in claim 1.

15. The mineral wool as claimed in claim 1, wherein the composition has a RO/(RO+R₂O) weight ratio of 0.48 or less.

16. The mineral wool as claimed in claim 1, wherein said mineral wool does not comprise a phosphorous-containing compound.

17. The mineral wool as claimed in claim 1, wherein said mineral wool has a fiberizing range of more than 40° C.

18. A thermal and/or acoustic insulation product, comprising the mineral wool as claimed in claim 16.

19. A fire resistant construction system comprising the mineral wool as claimed in claim 16.

* * * * *